United States Patent
Tanaka et al.

(10) Patent No.: US 6,840,546 B2
(45) Date of Patent: Jan. 11, 2005

(54) ELECTROFUSION JOINT

(75) Inventors: Hiroaki Tanaka, Yamaguchi (JP); Masaya Iwasaki, Yamaguchi (JP)

(73) Assignee: Mitsui Chemical, Inc., Tokyo (JP)

( * ) Notice: Subject to any disclaimer, the term of this patent is extended or adjusted under 35 U.S.C. 154(b) by 0 days.

(21) Appl. No.: 10/067,853

(22) Filed: Feb. 8, 2002

(65) Prior Publication Data

US 2002/0149199 A1 Oct. 17, 2002

(30) Foreign Application Priority Data

Feb. 8, 2001 (JP) ........................................ 2001-031716

(51) Int. Cl.⁷ .............................................. F16L 13/02
(52) U.S. Cl. ..................................... 285/21.2; 285/197
(58) Field of Search ............................... 285/21.2, 197, 285/198, 199; 137/318, 317

(56) References Cited

U.S. PATENT DOCUMENTS

| | | | | |
|---|---|---|---|---|
| 3,987,276 A | * | 10/1976 | Vogelsanger et al. | 285/21.2 |
| 4,455,482 A | * | 6/1984 | Grandclement | 285/21.2 |
| 4,624,487 A | * | 11/1986 | Thalmann | 285/197 |
| 4,655,480 A | * | 4/1987 | Thalmann | 285/21.2 |
| 4,894,521 A | * | 1/1990 | Evans | 285/21.2 |
| 5,076,318 A | * | 12/1991 | Fedora | 137/318 |
| 5,104,468 A | * | 4/1992 | de Jong | 285/21.2 |
| 5,150,923 A | * | 9/1992 | Ohya et al. | 285/21.2 |
| 5,577,529 A | * | 11/1996 | Katz | 285/197 |
| 5,975,117 A | * | 11/1999 | Schweitzer et al. | 285/197 |
| 6,412,824 B2 | * | 7/2002 | Kunsman | 285/197 |

FOREIGN PATENT DOCUMENTS

| | | | |
|---|---|---|---|
| DE | 195 29 191 C | 1/1997 | |
| EP | 0 088 703 A | 9/1983 | |
| EP | 0 552 710 A1 | 7/1993 | |
| JP | 02 134489 A | 5/1990 | |
| JP | 3288095 | * 12/1991 | 285/197 |
| JP | 510487 | * 1/1993 | 285/197 |
| JP | 587284 | * 4/1993 | 285/197 |
| JP | 406213385 | * 8/1994 | 285/197 |
| JP | 08 240294 A | 9/1996 | |
| JP | 08 285167 A | 11/1996 | |
| JP | 09 209419 A | 8/1997 | |
| JP | 11 170372 A | 6/1999 | |

* cited by examiner

*Primary Examiner*—David Bochna
(74) *Attorney, Agent, or Firm*—Birch, Stewart, Kolasch & Birch, LLP

(57) ABSTRACT

The invention provides an electrofusion joint made of a thermoplastic resin for connection with a resin pipe by heat generation of heating wires embedded in its saddle portion through electric conduction, such as a saddle joint comprising a saddle portion to be fitted to an outer circumferential surface of a resin pipe provided with heating wires embedded in its surface to be joined to the resin pipe, also comprising a spigot projecting from the saddle portion and to which a branch pipe is to be connected, or a service tee joint comprising a saddle portion in which heating wires are embedded, a trunk portion projecting from the saddle portion and a spigot projecting in a lateral direction from the trunk portion. A recess is formed in a part on the collar portion side along the base of the spigot of the saddle joint or trunk portion of the service tee joint, to increase the length from the recess to the collar portion where a latch of a clamping device is engaged, so that the collar portion becomes sufficiently flexible to achieve closer contact with the pipe and to prevent defective fusion welding, even though wall thickness or rigidity of the saddle portion is large.

4 Claims, 6 Drawing Sheets

ELECTROFUSION JOINT

BACKGROUND OF THE INVENTION

1. Field of the Invention

The present invention relates to an electrofusion joint for connecting a branch pipe with a main pipe made of a thermoplastic resin, particularly to an electrofusion joint provided with a saddle portion such as a saddle joint or service tee joint, to be joined at the outer circumferential surface of a main pipe.

2. Description of the Related Art

FIG. 5 is a side view of a saddle joint comprising saddle portion 1 and spigot 2 to which a branch pipe is to be connected, and which is generally made of a mold of medium density or high density polyethylene. As shown in the drawing, for electrofusion welding with a main pipe 3 made of a thermoplastic resin, the seating surface of the saddle portion is placed on the outer circumferential surface of the main pipe, and after clamping collar portion 4 on both sides of the saddle portion by engaging a latch of a clamping device that is not shown provided at the opposite side (lower side of FIG. 5), electric current is applied to heating wires embedded in the seating surface of the saddle portion.

During an electrofusion welding process, the seating surface of the saddle portion must remain in close contact with the outer circumferential surface of the main pipe. Otherwise, bubbles may be formed in the fusion welding interface during the electrofusion welding process, or the heating wires may move and contact each other to cause a short circuit.

However, since the joint is a molded product, it is difficult to mold it in such a manner that the seating surface of the saddle portion can achieve close contact with outer circumferential surface of the main pipe, and even if such precise molding is accomplished it will be difficult to fit the saddle portion on the main pipe by pressing the joint onto the main pipe from a lateral direction, if rigidity of the saddle portion is too large.

Wall thickness d of the saddle portion is generally designed to be around 10 mm regardless of the dimensions of the saddle portion, based on conventional usage. When wall thickness d is reduced, the saddle portion becomes less rigid and easier to fit to the main pipe. Therefore, a closer contact with the main pipe will be achieved. However, on the other hand, heat generated from heating wires through electric conduction is transferred to the outer surface if the saddle portion, and as a result the saddle portion tends to deform, resulting in lowered interface pressure and consequently in reduced fusion welding strength.

Therefore, as a general remedy a wall thickness d of approximately 10 mm is adopted for the saddle portion, and the saddle portion is made with a seating surface that has a slightly larger radius of curvature than the outer diameter of the main pipe, so that the saddle portion can be bent to make close contact with the lateral portions of the circumferential surface of the main pipe when clamped by a clamping device. On one side, if rigidity of the saddle portion is large, it can hardly be bent by clamping, and if the diameter of the spigot or trunk portion projecting from the saddle portion is large and the distance from the spigot or trunk portion to the collar portion is relatively short, the extent of possible flexure of the collar portion will be limited, resulting in inferior contact closeness with the outer circumferential surface of the main pipe.

SUMMARY OF THE INVENTION

An object of the present invention is to provide an electrofusion joint comprising a saddle portion that can achieve an improved contacting closeness with the lateral portions of the circumferential surface of a main pipe, by increasing flexure of a collar portion when it is clamped, even though rigidity of the saddle portion is large or the distance from a spigot or trunk portion projecting from the saddle portion to the collar portion is short.

The invention relates to an electrofusion joint made of a thermoplastic resin comprising a saddle portion, including but not limited to a saddle joint comprising a saddle portion provided with heating wires embedded in its seating surface to be joined to an outer circumferential surface of a resin pipe and with collar portions formed on its both sides so that a latch of a clamping device can be engaged; and a spigot projecting from the saddle portion and to which a branch pipe is to be connected; or a service tee joint comprising a saddle portion; a trunk portion projecting from the saddle portion; and a spigot projecting in a lateral direction from the trunk portion and to which a branch pipe is to be connected; wherein a recess is formed at least at a part on the collar portion side along the base of the spigot or trunk portion projecting from the saddle portion.

A preferred embodiment of the invention pertains to an electrofusion joint made of a thermoplastic resin that includes a saddle portion provided with heating wires embedded in its seating surface to be joined to an outer circumferential surface of a resin pipe, a spigot projecting from the saddle portion or projecting in a lateral direction from a trunk portion projecting from the saddle portion and to which a branch pipe is to be connected, and collar portions formed on both sides of the saddle portion so that a latch of a clamping device can be engaged, wherein a recess is formed only on a collar portion side in an entire circumference of a base of the spigot or the trunk portion.

According to the invention, since the recess can prolong the distance from the spigot or trunk portion to the collar portion, a larger flexure of the collar portion can be attained when the saddle portion is clamped with a main pipe by engaging a latch of a clamping device with the collar portion even though rigidity of the saddle portion is large or the diameter of the spigot or trunk portion projecting from the saddle portion is large, and as a result the seating surface of the saddle portion can make close contact with the main pipe. Also, the wall thickness of the saddle portion can be made thicker to prevent deformation of the saddle portion at the fusion welding, thereby a reduction in fusion welding strength due to a fall in interface pressure can be prevented.

As thermoplastic resin for a joint according to the invention, in many cases medium density or high density polyethylene is employed as in conventional products.

Another object of the invention is to provide an electrofusion joint comprising a saddle portion that has a wall thickness appropriately designed for resolving the foregoing problems.

Accordingly, the invention also provides an electrofusion joint comprising a saddle portion as defined above, wherein the saddle portion has a wall thickness in a range of 6 to 9 mm, preferably 7 to 8 mm.

The mentioned range of 6 to 9 mm wall thickness of the saddle portion has been determined because rigidity of the saddle portion becomes too large to achieve a sufficiently close contact if the wall thickness is more than 9 mm, while the saddle portion tends to deform due to heat from the heating wires embedded in the seating surface of the saddle portion, which will lower the fusion welding interface pressure, resulting in reduced fusion welding strength, if the wall thickness is less than 6 mm.

According to the invention, by forming the saddle portion of an appropriate wall thickness contacting closeness, with the main pipe is improved, therefore bubbles at the fusion welding interface and short circuits due to mutual contact of the heating wires can be minimized, and a sufficient fusion welding strength can also be achieved since a fall in interface pressure by deformation of the saddle portion can be prevented.

According to preferred aspect of the invention, a recess at least in a part on the collar portion side, along the base of the spigot or trunk portion is formed.

As a result, the advantages of aforementioned aspects of the invention can be enhanced further.

Other objects, features and advantages of the invention will become more apparent from the following description of the embodiments in conjunction with the accompanying drawings.

DESCRIPTION OF PREFERRED EMBODIMENTS

Figure 1:
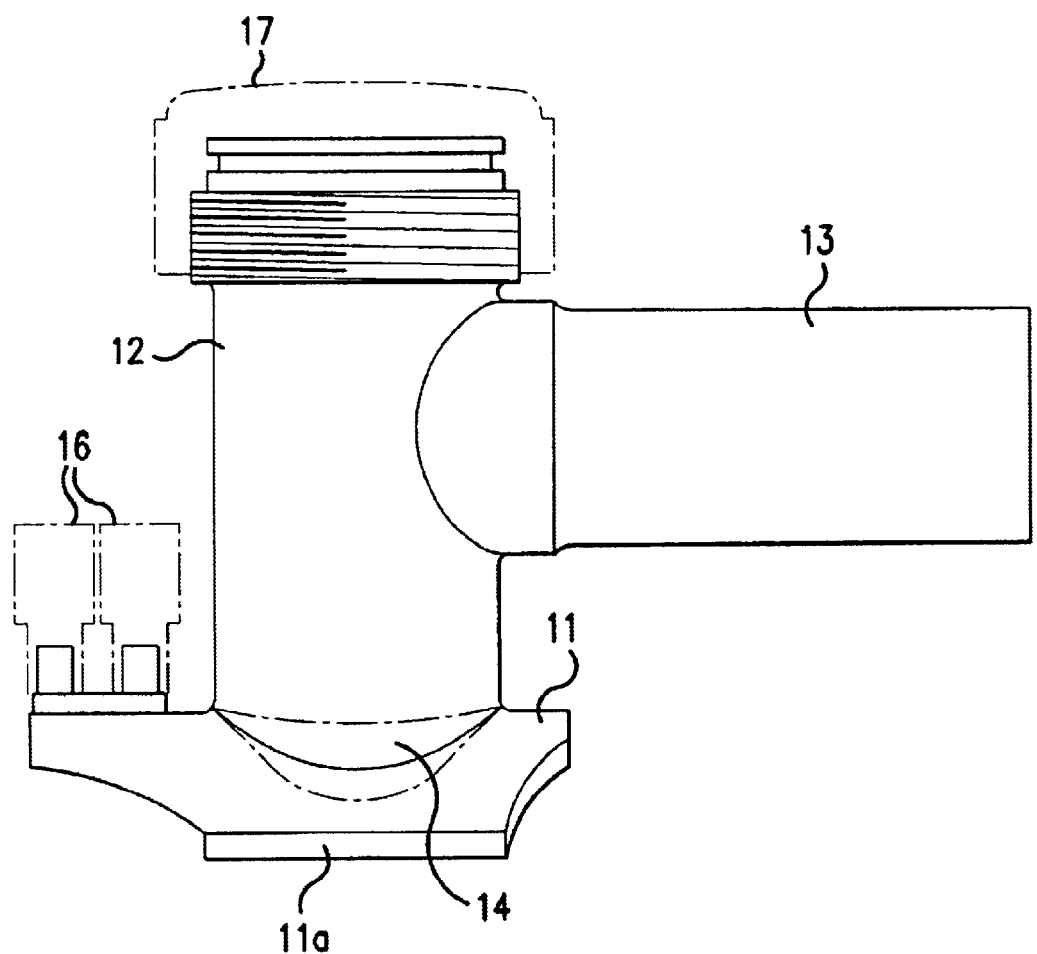
FIG. 1 is a front view of a service tee joint.
Figure 2:
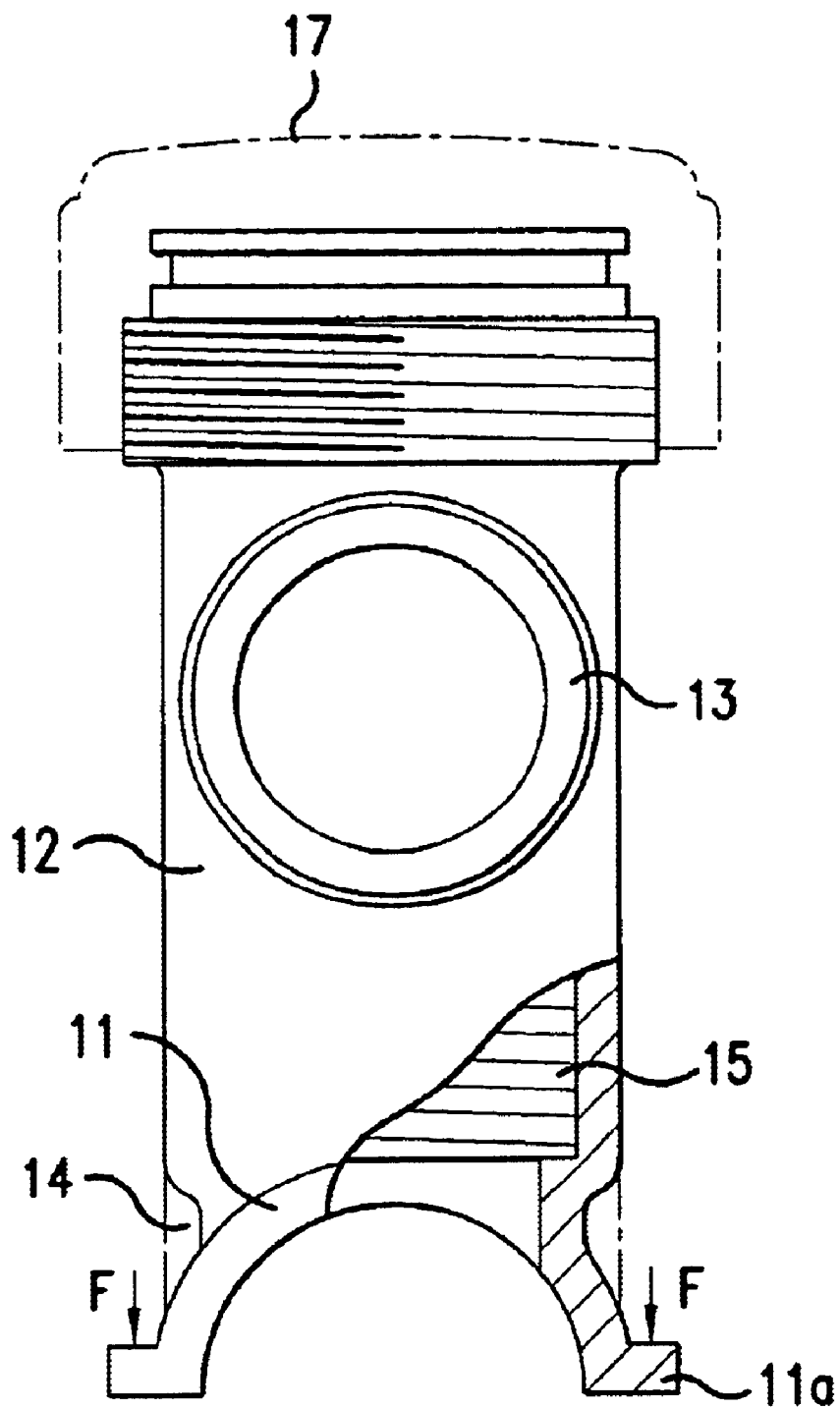
FIG. 2 is a side view including a partial cross-sectional view of the service tee joint of FIG. 1.
Figure 6:
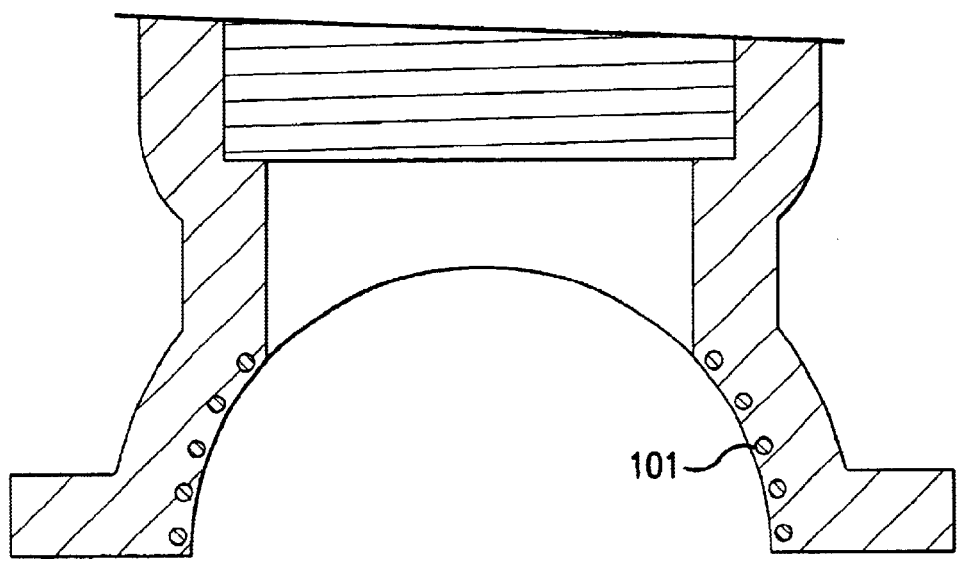
FIG. 6 is a full cross-sectional view of part of the service t-joint of FIG. 1.

FIG. 1 and FIG. 2 show a service tee joint, comprising a saddle portion 11 provided with heating wires 101 (See FIGS. 3 and 6) embedded in its seating surface to be joined to a resin pipe and a collar portion 11a on its both sides; a trunk portion 12 projecting from saddle portion 11 and into which a hole saw that is not shown is to be screwed; and a spigot 13 projecting in a lateral direction from trunk portion 12 and to which a branch pipe is to be connected; and a recess 14 is formed by denting a certain range on the collar portion side along the base of the trunk portion projecting from saddle portion 11, or outside a small diameter portion where the tip of a hole saw is engaged at the bottom of threaded portion 15 into which a hole saw is screwed.

Referring to FIG. 1 and FIG. 2, reference number 16 indicates a terminal to which connectors of the controller for electrofusion welding not shown are inserted, and number 17 indicates a cap screwed over the upper end of the trunk portion.

Figure 3:
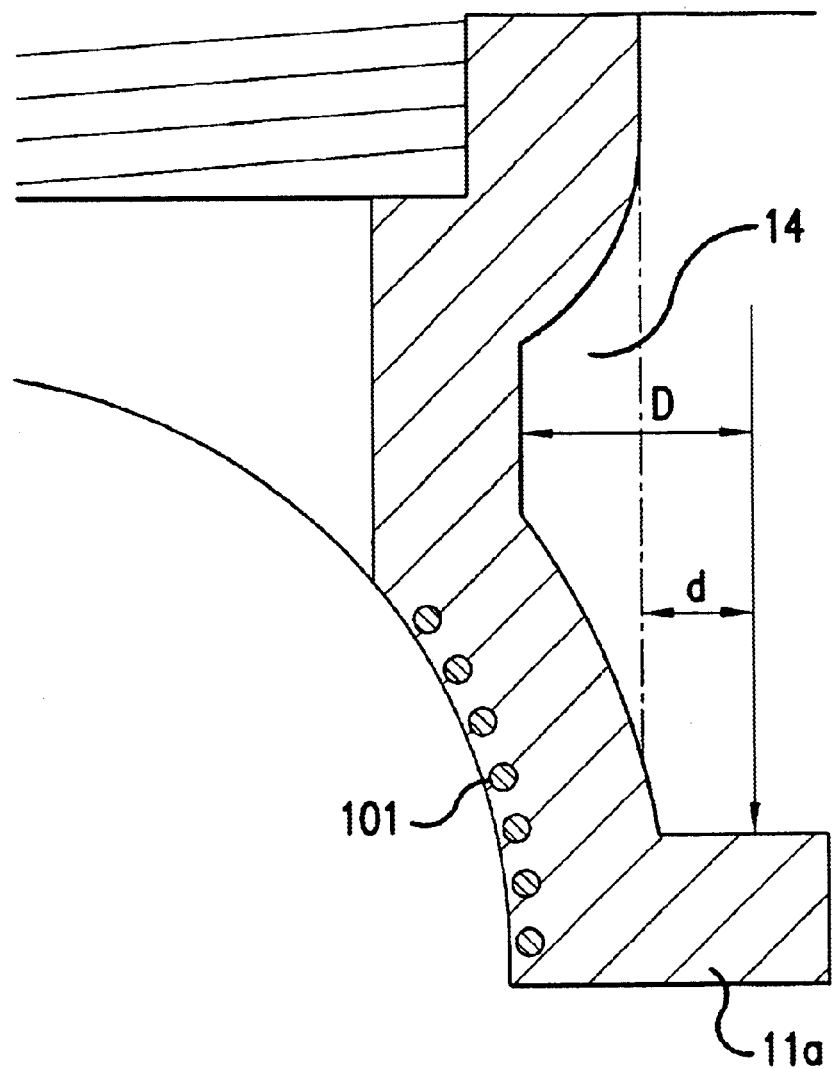
FIG. 3 is an enlarged cross-sectional view of a substantial part of the service tee joint of FIG. 2.

According to this Embodiment, as shown in FIG. 3 when a force F in the direction of the arrow is applied to collar portion 11a by clamping, a distance up to the line of action of force F, which was conventionally d as defined by the chain line, has been extended to D by forming a recess 14, and as a result the collar portion 11a gains a larger flexure toward the inside to achieve a closer contact with the resin pipe.

Figure 4:
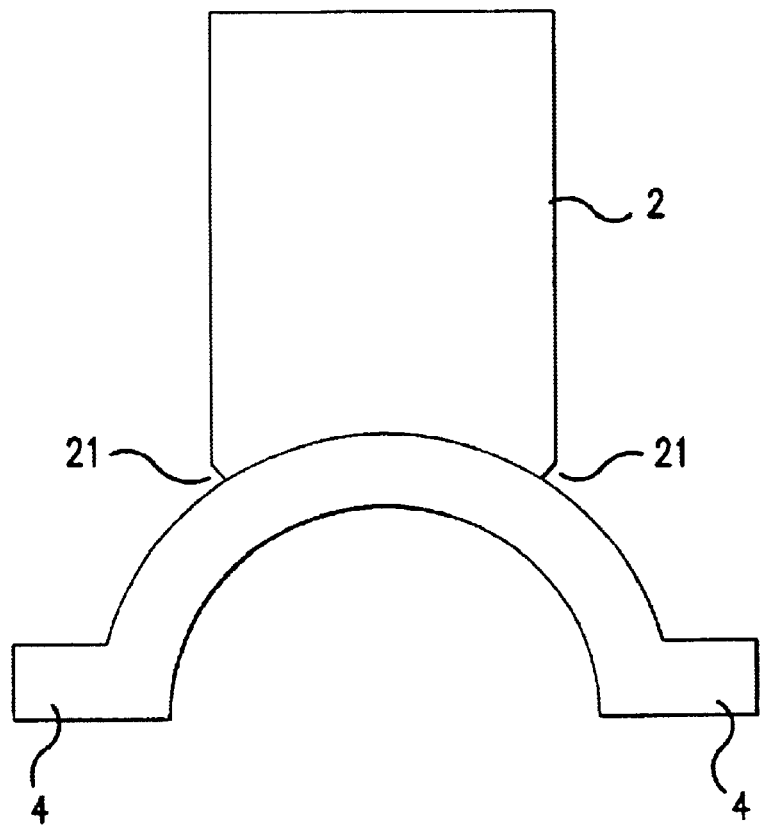
FIG. 4 is a side view of a service tee joint.
Figure 5:
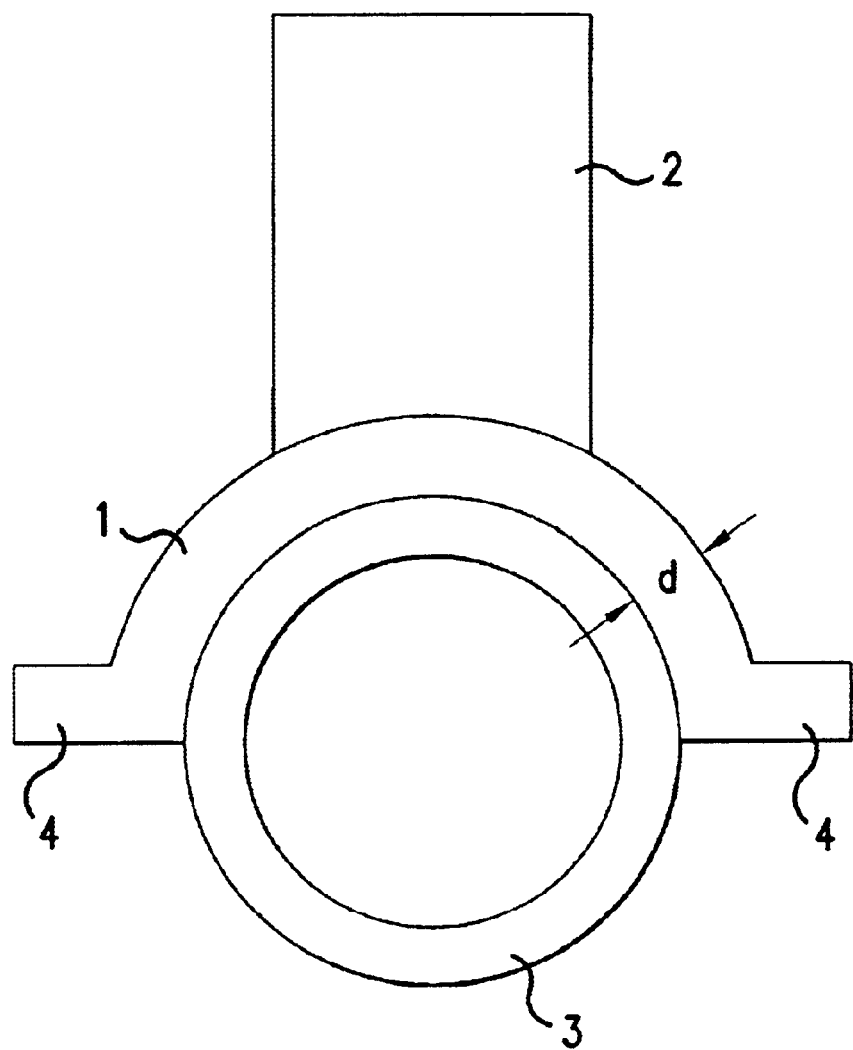
FIG. 5 is a side view of a conventional saddle joint.

FIG. 4 shows a similar saddle joint to that of FIG. 5, however, according to FIG. 4 a certain range closer to collar portion 4 along the base of spigot 2 is dented so that a recess 21 is formed.

Next, the following experiment was executed using electrofusion saddle joints shown in FIG. 1, with a saddle portion of a different wall thickness d.

[Experiment]

Electrofusion saddle joints made of medium density polyethylene for connection with a main pipe of 200 mm in diameter and a branch pipe of 30 mm in diameter, respectively having a saddle portion of a different wall thickness from 5 to 10 mm were prepared, and a plurality of electrofusion weldings were performed to join to a medium density polyethylene pipe under a low temperature of −10° C. After fusion welding the respective joints were cut open to examine whether bubbles had been formed in the fusion welding interface. Results are shown in Table 1 below.

TABLE 1

| Wall thickness of saddle portion | Number of joints that generated bubbles |
|---|---|
| 10 mm | 2/3 |
| 9 mm | 1/3 |
| 8 mm | 0/6 |
| 5 mm | 0/3 |

Referring to Table 1, denominators in the column of the "number of joints that generated bubbles" represent the number of units of fusion welded joints, and numerators represent the number of joints that generated bubbles. For example, in the case of saddle joints with a saddle portion of a wall thickness of 10 mm, after three times of fusion welding bubbles were found in two joints out of three joints that were fusion welded.

As shown in Table 1, no bubbles were found in joints with a saddle portion for which a wall thickness is 8 mm or less. However, some deformation was observed on the outer surface of the saddle portion with a wall thickness of 5 mm.

What is claimed is:

1. An electrofusion joint made of a thermoplastic resin comprising:

a saddle portion provided with heating wires embedded in its seating surface to be joined to an outer circumferential surface of a resin pipe;

a spigot projecting from said saddle portion or projecting in a lateral direction from a trunk portion projecting from said saddle portion and to which a branch pipe is to be connected; and collar portions formed on both sides of said saddle portion so that a latch of a clamping device can be engaged; wherein a recess is formed only on a collar portion side in an entire circumference of a base of the spigot or the trunk portion projecting from said saddle portion.

2. The electrofusion joint as set forth in claim 1, wherein the electrofusion joint is a saddle joint.

3. The electrofusion joint as set forth in claim 1, wherein the electrofusion joint is a service tee joint.

4. The electrofusion joint as set forth in claim 1, wherein the saddle portion has a wall thickness in a range of 6 to 9 mm.

\* \* \* \* \*